UNITED STATES PATENT OFFICE.

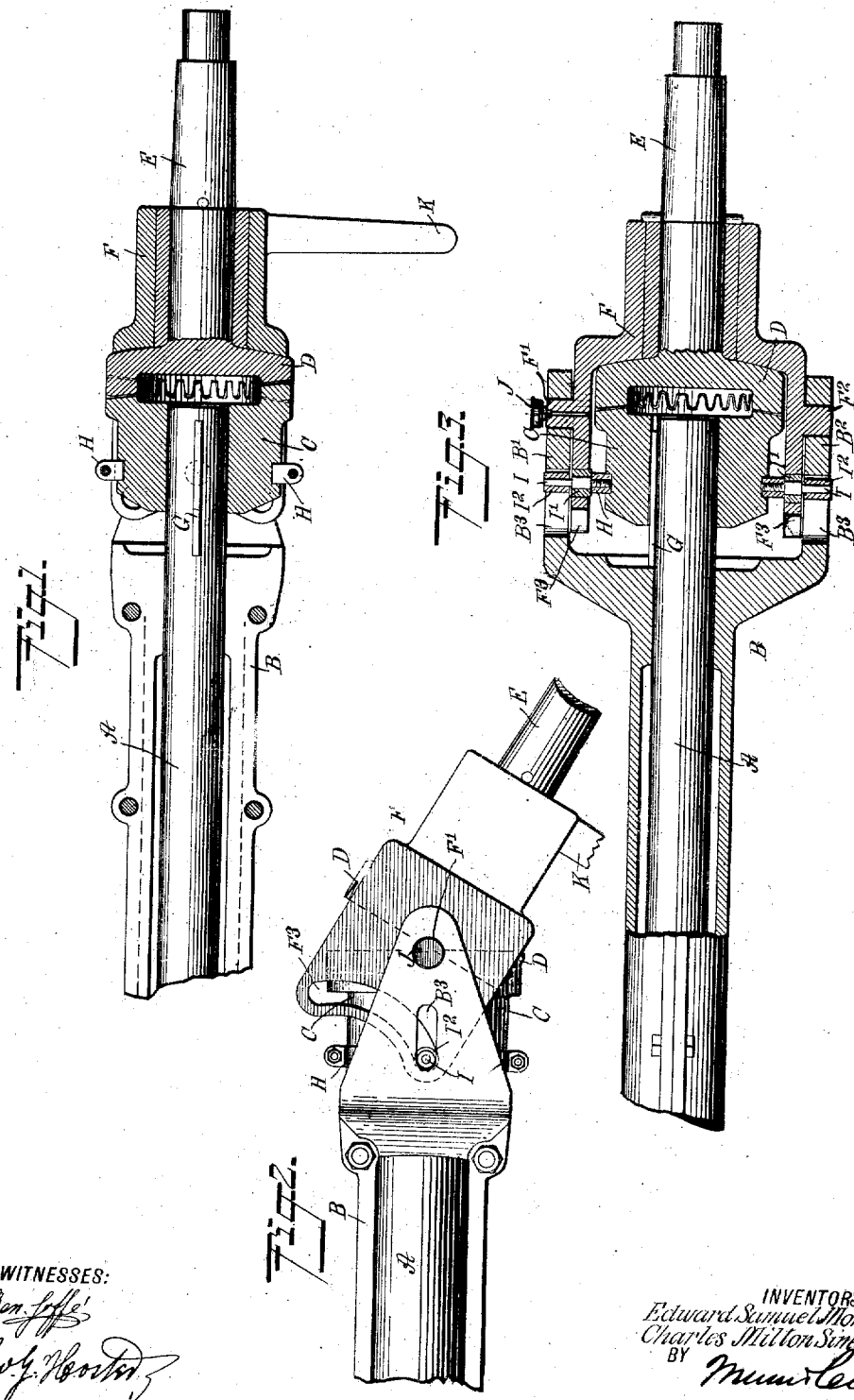

EDWARD SAMUEL MORROW AND CHARLES MILTON SIMMONS, OF CESTOS, OKLAHOMA.

POWER-TRANSMISSION MECHANISM.

988,729.      Specification of Letters Patent.      Patented Apr. 4, 1911.

Application filed January 19, 1910. Serial No. 538,941.

*To all whom it may concern:*

Be it known that we, EDWARD SAMUEL MORROW and CHARLES MILTON SIMMONS, citizens of the United States, and residents of Cestos, in the county of Dewey and State of Oklahoma, have invented a new and Improved Power-Transmission Mechanism, of which the following is a full, clear, and exact description.

The invention relates to automobiles and other power-driven vehicles, and its object is to provide a new and improved power transmission mechanism, more especially designed for driving the front axle, to cause the front wheel to pull when traveling in a straight line or in a curve. For the purpose mentioned, the driving axle and the stub axle are provided at adjacent ends with wheels in driving engagement with each other, one of the wheels being slidable axially, and means for moving the said slidable wheel axially on turning the stub axle out of alinement with the driving axle.

A practical embodiment of the invention is represented in the accompanying drawings forming a part of this specification, in which similar characters of reference indicate corresponding parts in all the views.

Figure 1 is a sectional plan view of the power transmission mechanism; Fig. 2 is a plan view of the same and showing the stub axle at an angle to the driving axle; and Fig. 3 is a sectional side elevation of the power transmission mechanism.

The driving axle A is journaled in a suitable bearing or a housing B, and the said driving axle A is connected, at or near the middle, with a suitable differential gearing driven from the motor of the automobile or other power-driven vehicle. Each outer end of the driving axle A is provided with a wheel C, in driving engagement with a wheel D, secured or formed on the stub axle E carrying the front vehicle wheel and journaled in a bearing F, provided at the top and bottom with trunnions $F'$, $F^2$, mounted to turn in the members $B'$, $B^2$ of a fork, formed or secured on the housing or bearing B. The wheels C and D are preferably provided with beveled teeth, but we do not limit ourselves to this particular form of driving wheels, as friction or other wheels may be employed.

The wheel C is mounted to slide on and to turn with the driving axle A, by the use of a key G, as shown in Fig. 3, and the hub of this wheel C is engaged by a shifting collar H, provided at the top and bottom with trunnions I, provided with friction rollers $I'$, $I^2$, of which the friction rollers $I'$ extend in cam slots $F^3$, formed in the bearing F, at the top and bottom thereof, and the friction rollers $I^2$ extend into longitudinal slots or guideways $B^3$, formed in the fork members $B'$, $B^2$ of the housing or bearing B.

The top trunnion $F'$ is provided with an oil cup J and oil grooves, for properly oiling the wheels C and D, to insure easy running of the same. The stub axle bearing F is provided with arms K, connected in the usual manner with the steering gear, so as to permit the operator to swing the bearing F and the stub axle E into an angular position, when deviating from a straight line course. Now when the bearing F and the stub axle E are moved into an angular position relatively to the driving axle A, then the cam grooves $F^3$ act on the friction rollers $I'$ and the trunnions I, to impart an inward sliding movement to the wheel C, so that the wheels C and D remain in full driving engagement with each other, and consequently the motion given to the driving axle A by the differential gearing is transmitted to the stub axle E and the corresponding front wheel, to cause the latter to pull when the vehicle travels around a curve. When the bearing F and the stub axle E are swung back into alinement with the driving axle A, then the wheel C is correspondingly shifted outwardly, to bring the contacting surfaces of the wheels C and D again in full driving contact with each other.

From the foregoing, it will be seen that by the arrangement described, the wheels C and D remain at all times in driving engagement with each other irrespective of whether the vehicle is traveling in a straight line, or deviates from the same when traveling around a curve, so that the power is transmitted to the fullest advantage to the stub axle E and the front wheel mounted thereon.

Having thus described our invention, we claim as new and desire to secure by Letters Patent:

1. A power transmission mechanism, comprising a driving axle, a stub axle, power-transmitting wheels in driving engagement with each other and mounted on the adjacent ends of the said axles, one of the wheels being slidable on its axle, and a connection between the hub of the sliding wheel and the bearing of the other wheel for moving the said slidable wheel axially on turning the stub axle out of axial alinement with the driving axle.

2. A power transmission mechanism, comprising a driving axle, a stub axle, a bearing for the driving axle, a bearing for the stub axle pivoted on the said driving axle bearing, power-transmitting wheels in driving engagement with each other and mounted on the adjacent ends of the said axles to rotate with the same, the power-transmission wheel on the driving axle being mounted to slide on the said driving axle, and a cam device for shifting the said slidable power transmission wheel on swinging the said stub axle bearing.

3. A power transmission mechanism, comprising a driving axle, a stub axle, a bearing for the driving axle, a bearing for the stub axle pivoted on the said driving axle bearing, power-transmitting wheels in driving engagement with each other and mounted on the adjacent ends of the said axles to rotate with the same, the power-transmission wheel on the driving axle being mounted to slide on the said driving axle, and a cam device for the said slidable power-transmission wheel and controlled by the said stub axle bearing.

4. A power transmission mechanism, comprising a driving axle, a stub axle, a bearing for the driving axle, a bearing for the stub axle pivoted on the said driving axle bearing, power-transmitting wheels in driving engagement with each other and mounted on the adjacent ends of the said axles to rotate with the same, the power-transmission wheel on the driving axle being mounted to slide on the said driving axle, a shifting collar engaging the hub of the said slidable power-transmission wheel and provided with trunnions engaging longitudinal guideways in the said driven axle bearing, and cams on the stub axle bearing engaging the said trunnions.

5. A power transmission mechanism, comprising a driving axle, a stub axle, a bearing for the driving axle, a bearing for the stub axle pivoted on the said driving axle bearing, power-transmitting wheels in driving engagement with each other and mounted on the adjacent ends of the said axle to rotate with the same, the power-transmission wheel on the driving axle being mounted to slide on the said driving axle, a shifting collar engaging the hub of the said slidable power-transmission wheel and provided with trunnions engaging longitudinal guideways in the said driven axle bearing, cams on the stub axle bearing engaging the said trunnions, and friction rollers held on the said trunnions at the said cams and guideways.

In testimony whereof we have signed our names to this specification in the presence of two subscribing witnesses.

EDWARD SAMUEL MORROW.
CHARLES MILTON SIMMONS.

Witnesses:
D. C. McAfee,
T. H. Doherty.

---

Copies of this patent may be obtained for five cents each, by addressing the "Commissioner of Patents, Washington, D. C."